United States Patent [19]
Shaw et al.

[11] 4,119,236
[45] * Oct. 10, 1978

[54] LOW PRESSURE RUPTURE DEVICE

[75] Inventors: Kenneth R. Shaw; Franklin A. Hansen, both of Riverside, Mo.

[73] Assignee: Continental Disc Corporation, Kansas City, Mo.

[*] Notice: The portion of the term of this patent subsequent to Mar. 21, 1995, has been disclaimed.

[21] Appl. No.: 759,002

[22] Filed: Jan. 13, 1977

Related U.S. Application Data

[63] Continuation-in-part of Ser. No. 712,931, Aug. 9, 1976, Pat. No. 4,079,854.

[51] Int. Cl.² .............................................. F16K 17/40
[52] U.S. Cl. ................................. 220/89 A; 137/68 R
[58] Field of Search .................. 220/89 A; 137/68 R, 137/69, 70, 71

[56] References Cited
U.S. PATENT DOCUMENTS

| | | | |
|---|---|---|---|
| Re. 26,102 | 10/1966 | Summers et al. | 220/89 A |
| 2,954,897 | 10/1960 | Hansen et al. | 220/89 A |
| 3,330,440 | 7/1967 | Summers et al. | 220/89 A |
| 3,445,032 | 5/1969 | Raidl, Jr. et al. | 220/89 A |
| 3,464,585 | 9/1969 | Summers et al. | 220/89 A |
| 3,698,598 | 10/1972 | Wood et al. | 220/89 A |
| 3,834,581 | 9/1974 | Solter et al. | 220/89 A |
| 3,881,629 | 5/1975 | Shaw et al. | 220/89 A |

*Primary Examiner*—Martin P. Schwadron
*Assistant Examiner*—Richard Gerard
*Attorney, Agent, or Firm*—Fishburn, Gold & Litman

[57] ABSTRACT

A safe pressure relief assembly of the reverse acting rupture disc type guards against very low pressure differentials and includes a thin, bulged sealing disc, a cutting member positioned in spaced relation to the sealing disc and extending a substantial transverse distance thereacross and a sealing disc support member having a stay arrangement projecting into supporting engagement with the concave side of the sealing disc, the stay arrangement having a resistance to collapse sufficient to retain the sealing disc out of contact with the cutting member only up to a predetermined differential pressure.

19 Claims, 11 Drawing Figures

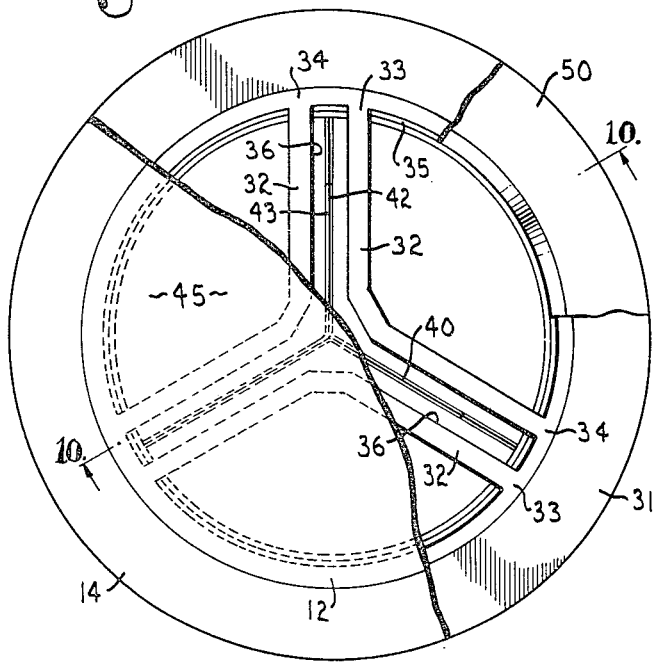
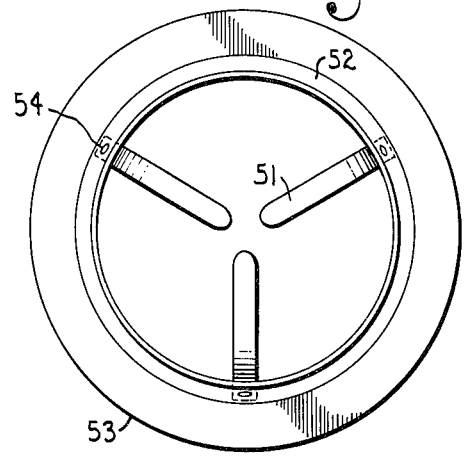
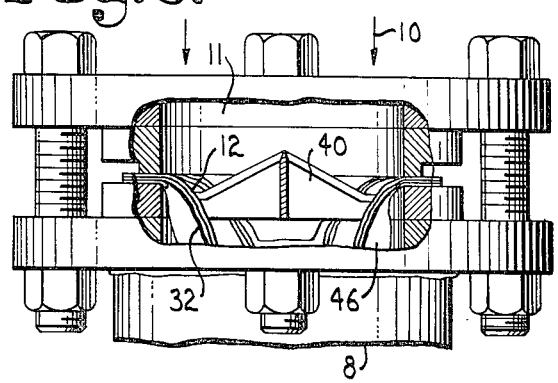
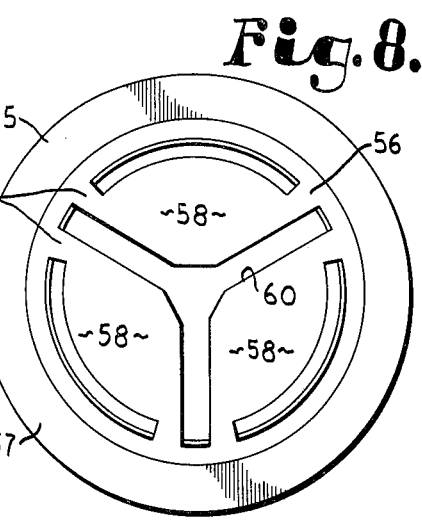
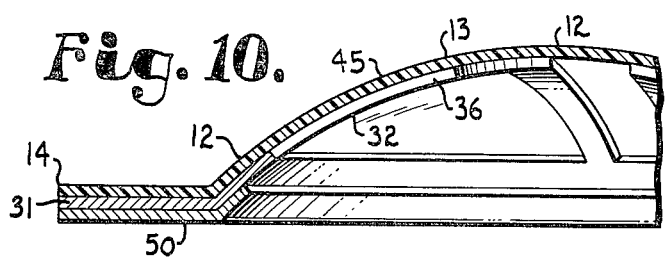
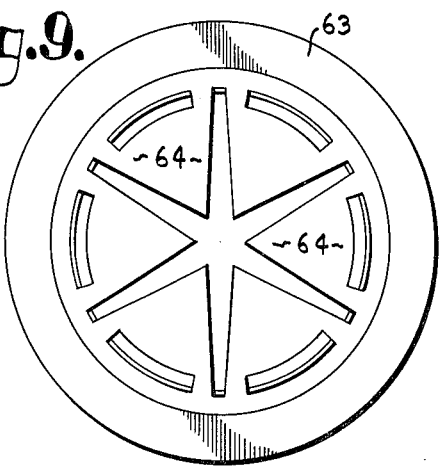

LOW PRESSURE RUPTURE DEVICE

This application is a continuation-in-part of pending application Ser. No. 712,931, filed Aug. 9, 1976, now U.S. Pat. No. 4,079,854 and relates to safety pressure relief devices and more particularly to improvements in rupture disc arrangements for protection against very low pressure differentials.

In recent years rupture discs have found increasing use as highly reliable pressure relief devices primarily to guard against the explosive conditions created when a vessel, for any reason, is subject to excessive internal pressure. In certain applications, the pressure differential guarded against is considered very low, as when relatively thin-walled stainless steel food or pharmaceutical processing tanks must be protected against accidental vacuum conditions, in the nature of $-0.5$ lb./in.$^2$, which could cause buckling inwardly under atmospheric pressure with resultant considerable damage and down time. Yet, accurate control of differential pressure relief is important, not only for equipment preservation, but for process preservation, since the opening of a vessel to ambient air can produce severe product contamination. Therefore, such arrangements have often used various multiple devices for protecting against excess differential pressure, including complex and expensive mechanical vent valves and vacuum breakers.

Pressure relief rupture discs of the reverse acting type, such as shown in U.S. Pat. No. 3,834,581 are well known, however, they tend to become inaccurate and unpredictable when the reverse acting disc, which is also normally the sealing disc, becomes thin enough to reverse at the low differentials contemplated herein.

In the practice of this invention, the thin, reverse acting disc and seal is associated with a support member which includes a bendable or frangible and relatively open or openable stay arrangement projecting inwardly and into supporting engagement with the concave side of the disc. A cutting member, having an elongated sharpened blade edge, is positioned in axially spaced relation from the concave side of the disc and extending a substantial transverse distance thereacross, with the stay arrangement suitably offset from the cutting member blade edge, whereby the disc is exposed to the blade edge along a substantial radial extent for cutting a large relief passageway therethrough upon deflection of the disc thereagainst. The stay arrangement is designed to have a resistance to bending or plastic deformation just sufficient to retain the disc out of contact with the blade edge only up to a predetermined, relatively small, differential pressure applied in the appropriate direction, whereupon it will permit the disc to be cut while moving with the disc out of effective flow restricting position. This is to be contrasted with structures such as that shown in U.S. Pat. No. Re. 26,102, wherein the reverse buckling rupture disc is supported by a substantial Belleville spring against collapse, operates under a relatively high pressure differential and, upon operation, provides only a small relief passageway for its size.

The principal objects of the present invention are: to provide a safety pressure relief assembly, of the reverse acting rupture disc type, which is accurate and predictable at very low pressure differentials; to provide such a safety pressure relief device which produces a relatively large relief passageway; to provide such a disc assembly which finds special value for use in connection with pressure vessels which must be protected against differential pressures of relatively small value, in the nature of one to ten inches of water column; to provide a pressure relief device of the reverse acting rupture disc type which is predictably operable at a predetermined low differential pressure heretofore considered outside the range of such devices; and to provide such safety pressure relief arrangements which are low in cost compared to alternate devices, reliable in function even after being exposed to considerable cycling at less than operational pressures and extremely well suited for their intended purpose.

Other objects and advantages of this invention will become apparent from the following description taken in connection with the accompanying drawings wherein are set forth by way of illustration and example certain embodiments of this invention.

FIG. 4 is a plan view, on the scale of FIG. 1, showing cooperatiang elements in assembled relation with portions broken away to reveal details of construction and relative position.

FIG. 6 is a view similar of FIG. 5 showing the cut disc and support stays folded inwardly of the relief passageway and away from the passageway axis.

FIG. 7 is a plan view, on a reduced scale, showing a modified form of disc support member.

FIGS. 8 and 9 are plan views similar to FIG. 7 and showing further modified forms of disc support members.

FIG. 10 is a fragmentary cross-sectional elevation, taken on line 10—10, FIG. 4, on an enlarged scale over FIG. 1, showing a disc, disc support member and optional support member support, in assembled relation.

FIG. 11 is a fragmentary cross-sectional elevation, on a further enlarged scale, illustrating an alternative construction wherein the disc support member is connected to the disc.

Figure 1:
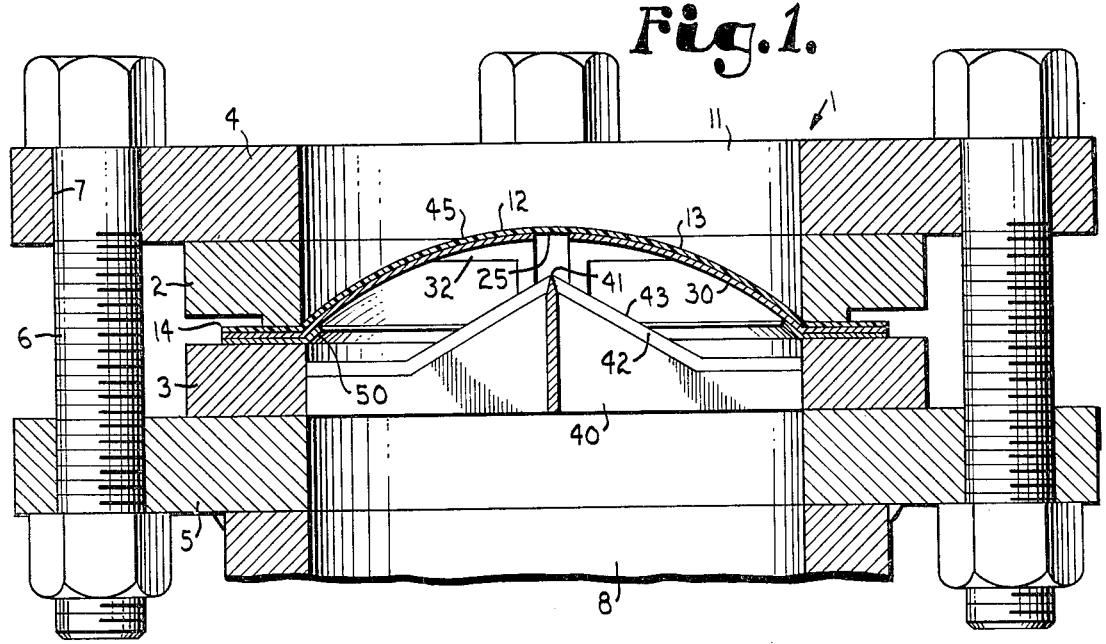
FIG. 1 is a somewhat schematic, vertical cross-sectional view of a safety pressure relief assembly embodying this invention and here positioned to guard against excess vacuum in a passageway.
Figure 3:
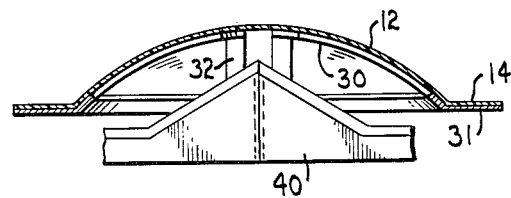
FIG. 3 is a vertical cross-sectional view, on a reduced scale, showing one type of disc support member in association with a disc and cutting member.
Figure 2:
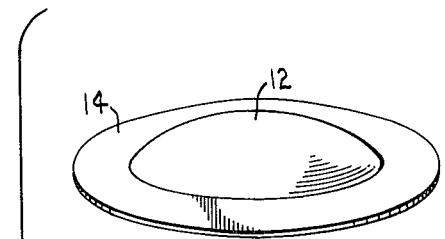
FIG. 2 is an exploded perspective view, on a reduced scale, showing various elements, and an optional element, of the assembly.

Material thickness in the drawings are often shown greatly exaggerated for illustration.

Referring to the drawings in more detail:

The reference numeral 1 generally indicates one example of safety pressure relief assembly embodying this invention. The assembly 1 is shown mounted between first and second supporting rings 2 and 3 which are, in turn, clamped between a pair of conventional annular pipe flanges 4 and 5 having a plurality of bolts 6 disposed through openings 7 positioned in spaced relationship about the peripheries thereof. It is to be understood, however, that other types of mounting arrangements may be used without departing from the scope of this invention, for example, that shown in U.S. Pat. No. 3,834,581, wherein a disc cutting member is supported within a centering ring having a flange secured between the same clamping surfaces as the disc flange. With this type of arrangement the rings 2 and 3 may not be needed, their function being essentially assumed by the pipe flanges.

The assembly 1, in this example, normally blocks flow into a pressure relief passageway 8 which communicates with a pressure vessel or the like for the purpose of protection against excessive vacuum conditions therein, although it is to be understood that a reversal of the assembly 1 will, in the alternative, provide protection from pressures of a predetermined amount above ambient. Upon actuation of the assembly, as described below, negative (reverse) flow 10 (FIG. 6) is permitted into the relief passageway 8, through the assembly opening 11.

The assemby 1 here comprises a relief disc and seal 12 having a concave-convex portion 13 connected to a surrounding annular flange portion 14. In this example, the flange portion 14 is flat, however, other flange configurations such as the known 30 degree seat or angular seat types may be used without departing from the scope of this invention.

Figure 5:
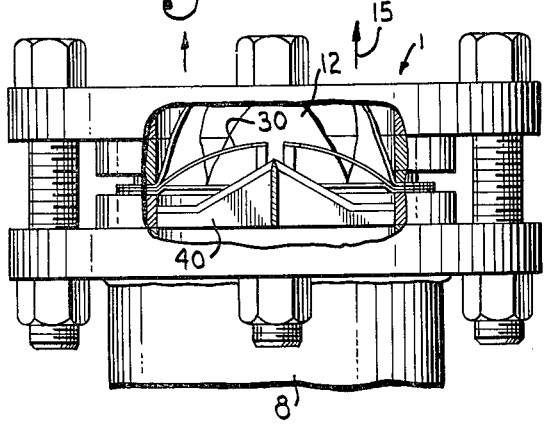
FIG. 5 is an elevational view of the assembly, on a reduced scale, with a portion broken away revealing the relief disc ruptured in a direction away from the cutting member and folded outwardly of the relief passageway and away from the passageway axis.

The concave-convex portion 13, in this example, is not intended to rupture in the forward direction 15, however, in the event of an over pressure on the concave side thereof, rupture can occur, producing tearing and relief such as shown in FIG. 5.

The disc 12 may be constructed of various gas impervious, flexible, easily deformable and relatively flimsy materials, including synthetic resin polymers, such as 0.001-0.005 inch thick Teflon, which have little resistance against deflection under pressure differentials in the range desired and which are not subject to substantial fatigue characteristics upon being slightly deformed in response to a large number of pressure cycles. Under certain conditions, very thin metal stock may meet the necessary requirements.

A disc support member 30 may be constructed of various materials, including selected metals and synthetic resin polymers, and, in this example, has an annular flange 31, preferably at least partially co-extensive with the disc flange portion 14 and three fingers or stays 32 integral therewith. The stays 32 form a saddle-like structure, projecting inwardly and axially of the flange 31 into supporting engagement with, or in close proximity to, the concave side 25 of the disc 12 and comprise relatively thin, elongated, spherically and planarly curved, bridging members which respectively extend from a peripheral flange anchor point 33 to a similar anchor point 34 located a substantial angular distance away on the support member annulus or passageway 35. The individual stay arrangement is here repeated three times, once for each stay 32, so as to produce a circumferentially symmetrical pattern about the passageway 35, with the stay legs of adjacent stays being generally parallel and spaced-apart, as best shown in FIG. 4, so as to form a three-slotted, star-like aperture 36.

A cutting member 40, in this example, is suitably mounted, as by welding, on the supporting ring 20 and radiates outwardly from an axially projecting central point 41, in three legs 42, although, as noted above, other mounting structures may be used. Also, other shapes having a different number of legs are feasible. Each of the legs 42 have an elongated, sharpened (preferably surgically ground) blade edge 43 positioned in axially spaced relation from the disc concave side 25 and extending a substantial transverse distance across the concave-convex portion 13. The blade edges 43 are here generally horizontal at the inner surface of the passageway 8 and, as they approach the center of the passageway, angle sharply, e.g., 30°, axially (upwardly in FIG. 1), to the central point 41, thereby producing a generally pyramidal shape roughly approximating the concave curvature on the disc concave side 25.

The stays 32 are positioned in predetermined offset relation with respect to the cutting member 40 so that the three-slotted aperture 36 is aligned both axially and circumferentially with the cutting member blades 42, whereby the disc 12 is exposed to the respective blade edges along a substantial radial extent thereof for cutting therethrough upon deflection of the disc thereagainst, FIGS. 1 and 4.

The stays 32 are designed to exhibit a resistance to bending or deformation sufficient to retain the flexible disc 12 out of contact with the cutting member blade edges 43 only up to a predetermined differential pressure applied to the convex side 45 of the disc.

When this differential pressure is exceeded, the stays 32 collapse, whereupon the disc concave-convex portion 13 engages the blade edges 43, causing cutting therethrough along multiple substantial transverse extents thereof. The disc concave side 25 will normally first contact the blade edges 43 at the point 41, producing an initial puncture which, under the force of the pressure differential, will rapidly spread, in this example, into three radially expanding and expansive slits corresponding to the extent of the cutting member blade edges 43. The three disc leaves 46 thus produced will easily and rapidly bend, with the stays 32, past the blade edges 43, inwardly toward the passageway 8 and away from the passageway axis, producing a large free flow path for rapidly relieving the excessive differential pressure (in this case, vacuum) detected in the vessel (not shown).

A support ring 50 may be optionally utilized to provide additional and more uniform support to the stays 32 in the area of the anchor points 33 and 34, particularly under conditions where the disc support member 30 is produced from very thin stock and/or the mounting ring supports or flanges are pitted or corroded.

Alternate examples of disc support members are shown in FIGS. 7, 8 and 9. FIG. 7 utilizes inwardly directed, cantilever mounted, fingers or stays 51 secured to the inner periphery 52 of an annular flange 53. The stays 51 may be riveted at 54 or otherwise secured at this point by welding, adhesives, etc. or produced integrally with the flange 53 by suitable punching and deforming operations. In this structure, the cutting member blade edges will radiate from the center into the spaces between the respective stays 51, but not necessarily equadistant therebetween.

In FIG. 8, the sealing disc support member 55 covers much more of the space within the annulus 56 within the flange 57. Here, the stays are relatively large area, circular finger-like segments 58 which are supported on the flange 57 at bridging points 59, the segments being separated in a triangular pattern to form a three-legged aperture 60, which, in the assembly, will align with the cutting member legs as described above in connection with FIG. 4. This structure is intended for relatively firmer support of the disc, for example, where the disc material is particularly flimsy, or higher pressure operating characteristics are sought.

FIG. 9 shows a further type of support member 63 which is similar in shape and function to that described in connection with FIG. 8, but having a larger number of finger-like stays or segments 64. The member 63 is adapted to be used with a one, three or six-legged cutting member.

If desired, a suitable seal (not shown) of thin, weak material may be placed within the passageway 8 to protect the cutting member 40 and disc support member 5 from corrosive or other adverse effects of moisture, chemicals, etc., which may be present within the pressure vessel during normal operation. Such seals are known in the industry and do not appreciably affect the operation of the relief assembly except in the very lowest operational ranges, where other precautions to so protect the assembly may be indicated.

Modified support characteristics may be produced by connecting the support member stays to the sealing disc. Referring to FIG. 11, a sealing disc support member stay 66 is secured to a Teflon disc 67 by means of a suitable adhesive 68, the Teflon being etched on its concave side 69 prior to the application of the adhesive in order to produce the desired bond. In utilizing structures such as that shown in FIG. 11, the disc will coact with the support member stays 66 to produce altered supporting and collapsing characteristics over non-connected arrangements.

It has been found that the above described structure permits a great range of low level protection in the area of up to about $\frac{1}{2}$ lb./in.$^2$ differential pressure, although it will be apparent to those skilled in this art that great variations are feasible in utilizing this invention.

If desired, a suitable screen or like structure (not shown) may be applied over the convex side 45 of the disc 12 to support the disc against pressure which would otherwise deflect same away from the support stays. Normal operation would not be affected thereby, so long as sufficient relief openings were provided in the screen or like structure.

It is to be understood that while certain forms of this invention have been illustrated and described, it is not to be limited thereto except insofar as such limitations are included in the following claims.

What is claimed and desired to secure by Letters Patent is:

1. A safety pressure relief assembly of the rupture disc type for mounting between inlet and outlet supporting members and adapted to block flow therepast to a predetermined differential pressure, said assembly comprising:
   (a) a relief disc having a concave-convex portion;
   (b) a disc support member having stay structure projecting into close proximity with the concave side of said disc concave-convex portion;
   (c) a cutting member having a cutting blade edge positioned in axially spaced relation from the concave side of said disc concave-convex portion and stay structure, said blade edge operably extending a substantial part of the transverse distance across said disc concave-convex portion and being offset from said stay structure whereby said disc concave-convex portion is exposed to said blade edge along a substantial extent thereof for cutting therethrough upon deflection of said disc concave-convex portion thereagainst, and
   (d) said stay structure being finger-like and having a resistance to deflection only sufficient to retain said disc concave-convex portion out of cutting contact with said blade edge up to a predetermined differential pressure applied to the convex side of said disc.

2. The safety pressure relief assembly as set forth in claim 1 wherein:
   (a) said support member stay structure close proximity is supporting engagement.

3. The safety pressure relief assembly as set forth in claim 1 wherein:
   (a) said support member stay structure comprises a plurality of fingers projecting inwardly of said disc concave-convex portion.

4. The safety pressure relief assembly as set forth in claim 1 wherein:
   (a) said support member stay structure comprises a plurality of generally circular segments.

5. The safety pressure relief assembly as set forth in claim 1 wherein:
   (a) said disc and said support member each have an annular mounting flange at least partially coextensive with each other.

6. The safety pressure relief assembly as set forth in claim 1 wherein:
   (a) said support member includes a mounting flange integral with said stay structure.

7. The safety pressure relief assembly as set forth in claim 1 wherein:
   (a) said support member comprises a mounting flange and said stay structure includes a non-integral finger mounted on said support member flange.

8. The safety pressure relief assembly as set forth in claim 1 wherein:
   (a) said support member stay structure is connected to said disc.

9. The safety pressure relief structure as set forth in claim 8 wherein:
   (a) wherein said stay structure is adhesively connected to said disc.

10. In a safety pressure relief assembly of the rupture disc type:
    (a) a relief disc;
    (b) a cutting blade positioned along and spaced from one side of said disc and having a substantial length with respect to the transverse width of said disc for severing said disc along a substantial transverse extent thereof in response to a differential pressure applied to the other side of said disc; and
    (c) finger-like stay structure transversely offset from the path between said cutting blade and said disc one side and extending into closer proximity to said disc one side than said cutting blade, said stay structure having a predetermined resistance to deflection so as to retain said disc out of contact with said cutting blade only up to a predetermined differential pressure applied to said disc other side.

11. The safety pressure relief assembly as set forth in claim 10 wherein:
    (a) said stay structure is in supporting engagement with said disc one side.

12. The safety pressure relief assembly as set forth in claim 10 wherein:
    (a) said stay structure comprises a plurality of fingers projecting inwardly of said disc.

13. The safety pressure relief assembly as set forth in claim 10 wherein:
    (a) said stay structure comprises a plurality of generally circular segments.

14. The safety pressure relief assembly as set forth in claim 10 wherein:

(a) said disc and said stay structure each have an annular mounting flange at least partially coextensive with each other.

15. The safety pressure relief assembly as set forth in claim 10 wherein:
   (a) said stay structure includes an integral mounting flange.

16. The safety pressure relief assembly as set forth in claim 10 wherein:
   (a) said stay structure comprises a mounting flange and a non-integral finger mounted on said flange.

17. The safety pressure relief assembly as set forth in claim 10 wherein:
   (a) said stay structure is connected to said disc.

18. The safety pressure relief structure as set forth in claim 17 wherein:
   (a) said stay structure is adhesively connected to said disc.

19. In a safety pressure relief assembly of the rupture disc type having a relief disc and a knife blade sized and positioned to sever said disc along a substantial transverse extent thereof in response to a pressure applied to said disc urging said disc onto said knife blade, the improvement of:
   (a) stay structure supporting said disc out of contact with said blade edge up to a predetermined pressure, said stay structure comprising finger-like support members bendable with said disc to positions providing a substantially open pathway for flow past said disc after said severing.

* * * * *